United States Patent [19]

Birlmeier et al.

[11] Patent Number: 4,605,824
[45] Date of Patent: Aug. 12, 1986

[54] CIRCUIT ARRANGEMENT FOR TELECOMMUNICATION EXCHANGE SYSTEMS, PARTICULARLY TELEPHONE EXCHANGE SYSTEMS WITH SWITCH FACILITIES FOR EMITTING SIGNALS

[75] Inventors: Josef Birlmeier, Deisenhofen; Klaus Eberlein, Wolfratshausen; Werner Nagler, Munich, all of Fed. Rep. of Germany

[73] Assignee: Siemens Aktiengesellschaft, Berlin & Munich, Fed. Rep. of Germany

[21] Appl. No.: 480,321

[22] Filed: Mar. 30, 1983

[51] Int. Cl.$^4$ .............................................. H04M 3/02
[52] U.S. Cl. .............................. 179/18 HB; 179/18 J; 179/7.1 R
[58] Field of Search ............. 179/18 HB, 18 J, 18 ES, 179/7.1 R, 7.1 TP, 8 R, 84 R, 84 A, 51 AA, 8 A

[56] References Cited

U.S. PATENT DOCUMENTS

| | | | |
|---|---|---|---|
| 4,079,210 | 3/1978 | Sanderson | 179/18 HB |
| 4,113,990 | 9/1978 | Nojiri et al. | 179/84 R |
| 4,165,447 | 8/1979 | Bertoglio et al. | 179/7.1 R |
| 4,220,824 | 9/1980 | Castriotta et al. | 179/18 J |
| 4,273,964 | 6/1981 | Szpindel | 179/84 R |
| 4,347,582 | 8/1982 | Frank | 364/900 |
| 4,349,703 | 9/1982 | Chea, Jr. | 179/18 HB |
| 4,354,062 | 10/1982 | Mussman | 179/84 A |
| 4,355,206 | 10/1982 | Israel et al. | 179/18 HB |
| 4,409,438 | 10/1983 | Akuta | 179/18 HB |
| 4,431,992 | 2/1984 | Boulard et al. | 340/825.53 |

Primary Examiner—Gene Z. Rubinson
Assistant Examiner—Elio DiVito
Attorney, Agent, or Firm—Hill, Van Santen, Steadman & Simpson

[57] ABSTRACT

A telecommunication exchange system has a plurality of switch facilities over which signals are emitted on an average only during a part of their respective occupation. A signal current source for emission of the signals is provided having a call-handling capability limited by signal current load. A signalling system is provided for serving a distribution of the load and provides pulse sequences having respectively identical pulse spacings. Pulses of different pulse sequences simultaneously transmitted over different switch facilities have chronologically different phase relations and a chronological offset from switch facility to switch facility. The offset is such that the pulses of the different pulse sequences connect chronologically to one another with respect to pulse termination and pulse beginning. The switch facilities are allocated for receiving the pulse sequences from the signalling system to a respective one of the pulse sequences of a specific phase relation. The allocation is executable upon consideration of allocations already existing and affecting signalling events. No more than a given number of switch facilities is allocated with respect to the pulse sequences having a respective specific phase relationship. This given number is determined by the signalling current loadability of the current source. With a given allocation of this given number of switch facilities to each of the plurality of phase relations, one or more additional switch facilities request an allocation to a phase relation for signalling, they either receive a signal to abort a setup of the calls or are only allocated a respective phase relation after a given limited delay time if the switch facilities allocated to the phase relation have become fewer than said given number, or if all allocations remain filled at the end of the given delay time, receive the signal to abort setup of the call.

8 Claims, 3 Drawing Figures

# CIRCUIT ARRANGEMENT FOR TELECOMMUNICATION EXCHANGE SYSTEMS, PARTICULARLY TELEPHONE EXCHANGE SYSTEMS WITH SWITCH FACILITIES FOR EMITTING SIGNALS

BACKGROUND OF THE INVENTION

The invention relates to a circuit arrangement for telecommunication exchange systems, particularly telephone exchange systems, with a plurality of switch facilities over which, on the average, signals are emitted only during a part of all of their respective occupations. The signals are emitted by means of connection to a signal current source having, in view of the signal current load, a limited performance capacity or call handling capacity. A signal emission serves a distribution of the load and is provided in the form of pulse sequences having respectively identical pulse spacings. The pulses of pulse sequences simultaneously emitted over different switch facilities exhibit chronologically different phase positions and, as a result, a chronological offset from switch facility to switch facility. An offset is provided such that the pulses of different pulse sequences are chronologically connected to one another with respect to pulse termination and pulse beginning.

A circuit arrangement of this type has already been disclosed in German OS No. 28 42 350. It is disclosed therein that a chronolgical graduation of the signalling helps to avoid, at a given time, overload of current supply devices. Therefore, a metering pulse transmission is required. This signalling emission occurs during the duration of a through-connected call connection given metering pulse selectors of domestic long-distance technology for which the reference is particularly significant. In the average overall duration of the occupation of a metering pulse selector, the call setup only takes up a relatively small fraction of this time. Since metering pulse selectors are relatively heavily loaded switching facilities, one can proceed of the basis that metering pulse selectors which are almost always occupied are executing a metering pulse emission to the counter of the respective calling subscriber for most of the time during each of their occupations. It is therefore provided in the known case that a plurality of phase positions are fixed for metering pulses of each pulse sequence frequency and that the pulses of each of these different phase positions are respectively emitted over one line. Thus, the same number of lines are provided as there are phase positions for one respective pulse sequence frequency. Since each metering pulse selector is occupied most of the time, and since metering pulse emission occurs over the greatest part of this time span during the duration of the occupation of a metering pulse selector, a relatively uniform load of a current source supplying the metering pulse emission in the various phases results.

Differing from the known facts, there can also be instances in which such a statistical uniform distribution and an automatically achieved load balance cannot be achieved. When, for example, the signalling only takes up a relatively short time span in the overall duration of each occupation, the plurality of switch facilities in which signalling is occurring pulse-wise at the time represents only a relatively small part of all of the switch facilities. When the signalling such as, for example, in the emission of the call current, always lies at the beginning of the occupation of such a switch facility, for example, of a subscriber line circuit occupied on an incoming basis, a chronological accumulation of connection setup events at specific subscribers can result in a load balance on the basis of statistical distribution not occurring or not occurring to a sufficient degree. In other words, an overload of a signal current source occurs, which can result in the fact that an insufficient signalling, for example with an undervoltage, occurs.

SUMMARY OF THE INVENTION

An object of the invention is to insure a protected signalling under different preconditions than those known from the above German patent publication, and to prevent a corresponding signal current source from overloading.

This object is achieved in that the switch facilities for signalling, particularly for the emission of ringing current pulses, can be respectively allocated to one of the pulse sequences, i.e. a pulse sequence having a specific phase position. The allocation can be randomly executed by taking into consideration already existing allocations which effect signalling events. Each of the pulse sequences with one respective specific phase position has a plurality of switch facilities allocated to it. This plurality of facilities is not greater than a signal current load prescribed by the loadability of the signal current source. With a given allocation of this plurality of switch facilities in each of the several phase positions, further switch facilities which request an allocation to a phase position for a signalling receive a signal to abort the connection setup, in particular, a busy signal. Alternately, after a particularly limited delay time, they are respectively allocated to a phase position in which the switch facilities allocated thereto have become fewer in number than the plurality and, given limitation of the priority time, receive the signal to abort the connection setup.

DESCRIPTION OF THE PREFERRED EMBODIMENTS

Figure 1:
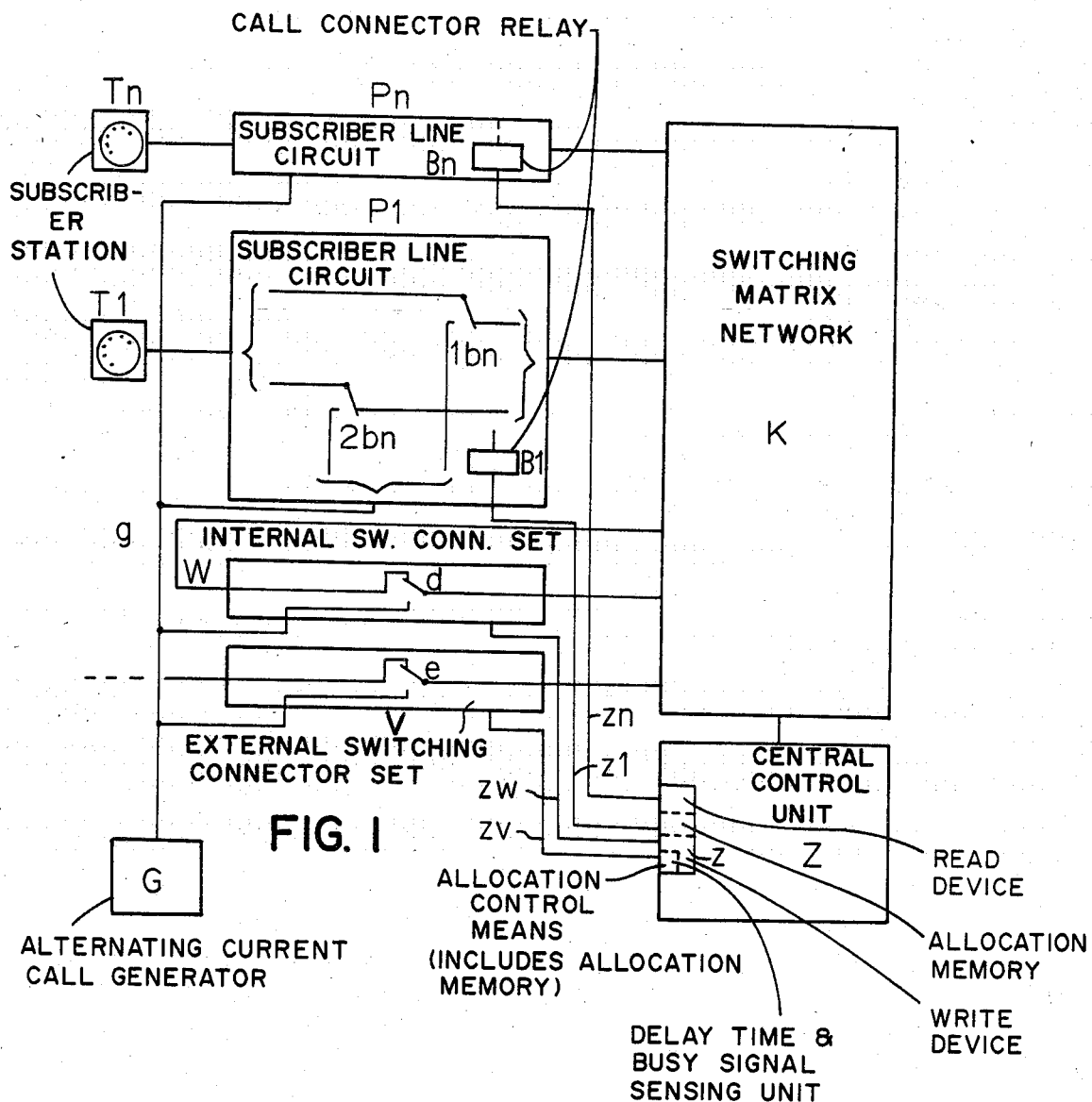
FIG. 1 illustrates a telephone exchange system in accordance with the invention.

A telephone exchange system is illustrated in block diagram format in FIG. 1. Subscriber line circuits P1 through Pn, local-call or internal switching or connector sets W, and external switching or connector sets V are connected to a switching matrix network K with inverse grouping. A central control unit Z serves the purpose of handling the call setup events. The control unit illustrated here can also be a decentralized control unit. In this case, a larger plurality of decentralized control units cooperates in a known manner with a shared central control unit. The events of the call setup are presumed here as being known and are therefore not described in detail. In the present case, the technical realization of the emission of alternating current ringing pulses of dialed subscriber stations is the priority concern. Such subscriber stations are referenced T1 and Tn in the drawing.

The subscriber line circuits P1 through Pn can serve as call-associated switch facilities for the emission of alternating current ringing pulses but—as is also known from conventional telephone exchange technology—so can call-associated switch facilities such as internal connector or switching sets W and terminator or external switcning circuits V of incoming or bidirectional trunk lines.

The present description is based on a telephone exchange system having a pure space-division multiplex switching matrix network K. However, it is just as possible to realize the invention in a time-division multiplex exchange system. Just as it can be a matter of a telephone exchange system, it can also be a matter of a teleprinter exchange system or a matter of an exchange system for setting up connections for data transmission. Instead of an emission of alternating current ringing pulses, an emission of subscriber fee metering pulses, for example, dc pulses, can also be provided.

A call connector relay B1 is illustrated in the subscriber line circuit P1. It is connected to the central control unit over an individual line. Decentralized control devices can also be allocated to the subscriber line circuits. These decentralized control devices in turn receive their control information from the central control unit and execute the required control operations with respect to the subscriber line circuits allocated to them in group wise fashion. A call connector relay Bn is provided in the subscriber line circuit Pn in the same manner. Call connector relays (not illustrated) are likewise provided in the connector sets V and W.

The contacts of the call connector relay B1 in the subscriber line circuit P1 are the change-over contacts $1bn$ and $2bn$. In the idle condition, the corresponding subscriber station T1 within the subscriber line circuit P1 is connected to a two-lead central office line continuing to the switching matrix network K. This connection can proceed over further switch means such as, for example, repeaters. Furthermore, switch means for the dc feed of the subscriber stations can be provided. This is presumed as being known.

When a subscriber station is called, for example subscriber station T1, then a ringing alternating current is emitted in a known manner pulse-wise over the corresponding subscriber line to the connected subscriber station. The call connector relay B1 serves this purpose. Corresponding electronic switch means can be provided instead of an electromagnetic relay. It is also possible to combine a plurality of subscriber line circuits to form a multiple line circuit such as described, for example, in German OS No. 28 26 113, for the time-division multiplex telephone exchange systems.

The ringing current emission occurs in a known manner such that, soon after completion of a call setup over the switching matrix network K and, if need be, over central office lines, a first alternating current call pulse is transmitted toward the dialed subscriber station. In the present case, this occurs with the contacts $1bn$ and $2bn$ being transferred from their illustrated idle condition into their work condition during the duration of the alternating current call pulse. By so doing, the corresponding subscriber station is connected during the alternating call pulse to a shared two-lead alternating current call line g which is connected to a shared alternating current call generator G. As soon as the called subscriber answers, the emission of alternating current call pulses to his subscriber station is terminated in a known manner.

During the overall duration of the occupation of a subscriber line circuit, thus a pulse-wise ringing current emission is provided only during a relatively small part of the time, namely until the called subscriber answers. The corresponding signal current source in the present case, the alternating current call generator G, is equipped with a call-handling capacity which suffices for all normally occurring operating situations in order to be able to emit an alternating call current of sufficient strength in parallel to a plurality of subscriber stations to be called simultaneously. The call-handling capacity of the alternating curreng call generator G is thus limited. It suffices in order to be able to supply the required alternating call current even under extreme operating conditions.

The emission of alternating current call pulses occurs after a first alternating current call pulse, and with further alternating current call pulses which follow one another with uniform chronological spacings. Let the duration of a first alternating current call pulse amount to 500 ms, whereas the duration of the further alternating current call pulses respectively amounts to 1 second. The chronological spacings between two mutually successive further alternating current call pulses amounts to 10 s, respectively measured from pulse beginning to pulse beginning.

The load distribution of the alternating current call generator G which controls the various subscriber line circuits and connector sets is achieved in that the alternating current call pulse sequences which per respective connection exhibit identical pulse spacings from alternating current call pulse to alternating current call pulse, are emitted with chronologically different phase positions. A chronological offset results from subscriber line circuit to subscriber line circuit with respect to the relative time slots of the emitted ringing current pulse sequences. The analogous situation applies to the connector sets.

Figure 2:
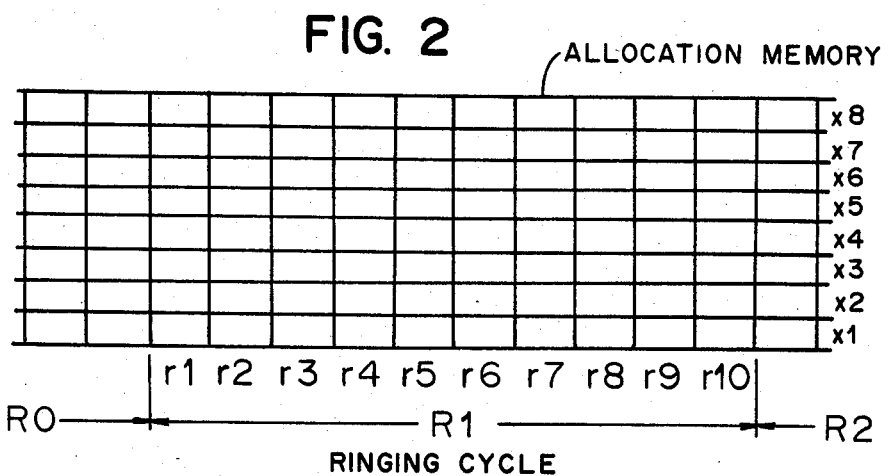
FIG. 2 illustrates a layout of an allocation memory contained in an allocation control means shown in FIG. 1.

The division of a ringing cycle R1 into ten ringing phases r1 through r10 is indicated in FIG. 2. The ringing cycle R1 is preceded by a corresponding ringing cycle R0 and is followed by a corresponding ringing cycle R2.

For signalling purposes, the switch facilities (i.e., the subscriber-assocaited subscriber line circuits as well as the call-assocaited connector sets) are inventively allocatable time-slot-wise in the call condition to one of the respective pulse sequences, i.e. one respective pulse sequence having a specific phase relation. An allocation control means z is provided for this purpose in the central control unit Z. This contains an allocation memory which is constructed in accordance with the illustration in FIG. 2. The memory respectively corresponds in size to a ringing cycle. Ten columns in the memory are allocated to the ten phase relations within a ringing cycle. Each of the coulmns is subdivided into eight parts by eight rows. The address of one of the devices for signalling can be written in each memory part of the column of the allocation memory.

As now shown on the basis of the illustration in FIG. 2, a respective alternating current call pulse can be emitted to eight different subscriber stations during each of the ten different phase relations. Of course, these numerical specifications are only examples which are non-binding on the invention. After completion of a connection setup to the subscriber line circuit of the respectively dialed subscriber, this subscriber line cirucit is allocated as a switch device for alternating current call pulse signalling to a specific phase relation allocated by the allocation control means z of the central control unit Z. The allocation of a switch device to a phase relation results in the fact that the address of the corresponding switch device is written into a portion of that column of the allocation memory corresponding to the corresponding phase relation. This portion of the memory of the corresponding column of the allocation memory corresponds to one of the rows x1 through x8. This allocation is undertaken with the assistance of the allocation control means z in such manner that the corresponding switch device is allocated to a phase relation in whose column in the allocation memory at least one memory portion is still free. When a column is no longer free in any memory portion, this means that the normal loadability of the ringing current source G has already been fully exhausted in the corresponding phase relation. This allocation thus occurs in such manner that a plurality of switch facilities no greater than determined by a signal current load prescribed by the loadability of the signal current source is allocated to each of the pusle sequences with a respective specific phase relation.

The various switch devices are a likewise driven by the allocation control means z by means of the respective addresses stored in each of the columns of the allocation memory according to FIG. 2. At the beginning of a phase relation, all switch devices which are allocated to corresponding phase relations receive an instruction by means of which the respective call connector relay in each of the switch devices is caused to respond. At the end of this phase relation, these switch devices respectively receive an opposite instruction by means of which the corresponding call connector relays are reset into their idle position. Since the next phase relation begins immediately with the end of one phase relation, the call connector relays in all those switch devices which are allocated to the next phase relation are actuated immediately thereafter. At the end of the next phase relation, the corresponding call connector relays are also reset into their idle position. When the time span of the last phase relation of a ringing cycle has elapsed, then a next calling cycle begins with its first phase relation. Alternating current call pulses are forwarded for transmission over the various switch facilities in chronological graduation in this manner.

In addition to these alternating current call pulses of a respective continuous alternating current call pulse sequence, a respective first alternating current call pulse is forwarded for transmission earlier, immediately after each call setup. This first alternating current call pulse thus is independent of the time grid prescribed according to FIG. 2. The call-handling capacity of the alternating current call generator G is designed such that a peak loadability is fixed proceeding beyond the normal loadability. The difference between peak loadability and normal loadability is selected such that the call-handling excess suffices for execution of the emission of first alternating current call pulses.

For handling the allocation of the switch facilities to one respective phase relation carried out by the allocation control means z, in the allocation means z the plurality of switch facilities which are respectively allocated to one pulse sequence with one phase relation differs by at most one, relative to the various pulse sequences with different phase relations. Given such an allocation operation, thus the allocation always results in a phase relation to which the respectively smallest plurality of switch facilities is allocated at the time. It is thus achieved that the plurality of switch facilities per phase relation is as identical as possible from phase relation to phase relation. As uniform as possible a current loading of the alternating current call generator G is thereby achieved.

Beyond this, a switch facility may be allocated to a pulse sequence corresponding to a phase relation in such manner upon consideration of the current loadability of the signal current source that the alternating current call pulse following a first ringing current pulse, i.e. the first of the further alternating current call pulses, has a chronological spacing from the first ringing current pulse such that the spacing is not greater than the chronological spacings between the further alternating current call pulses. At the same time, however, it is approximated as far as possible in terms of chronological duration to the spacing between the further alternating current call pulses. The aforementioned uniform distribution of the switch facilities to the various alternating current call pulse phase relations is a favorable pre-condition for this.

The various switch facilities are connected over individual lines z1, zn, zv, zw to the allocation control means z of the central control unit Z, or to a corresponding respective decentralized control unit. However, it is also possible to provide memory means in each of the switch facilities for storing the phase relation to which a switch facility is respectively allocated. In this case, the plurality of lines z1 through zw can be eliminated. Thus, the information specifying the respective allocation of a switch facility to a phase relation is deposited in a completely decentralized manner in each of the corresponding switch facilities. In this case, the switch facilities are driven with a common clock. Under the influence of this clock, each of the switch facilities then undertakes the connection of the corresponding subscriber station to the alternating current call generator on the basis of the stored information concerning the allocation.

It may also be pointed out that, instead of alternating current call pulses, pulse sequences of different type and pulse sequences for different purposes can be forwarded for emission.

When all memory portions in all columns are already occupied in the allocation memory, and thus each ringing phase has already had eight respective switch facilities allocated to it, and when a further connection is set up, then the central control unit encounters no free memory in the various columns of the allocation memory. The limit of the loadability of the alternating current call generator has thus been reached. In this case, no alternating current call pulses can be emitted at the time to the dialed subscriber station. Therefore, the corresponding switch device is switched into its busy condition and the busy signal is transmitted to the corresponding calling subscriber.

Deviating therefrom, another modified embodiment provides that, in the operating case discussed above, the corresponding switch facility is respectively allocated to a phase relation only after a specific delay time (ringing delay) when the central control unit Z no longer encounters a free memory portion in the various columns of the allocation memory after setup of a connection over the switch facility, for example a subscriber line circuit, to a subscriber. This delay time can be limited with the assistance of time-measuring switch means which shall be explained in greater detail below. This allocation then respectively corresponds to a phase relation of a type in which the switch facilities allocated to the phase relation have become numerically fewer than the number of switch facilities over which ringing signals may be simultaneously emitted, conditioned by the maximum loadability of the ringing current generator.

It is possible to leave this ringing delay time unlimited. This means that, in the operating case of a ringing signal not immediately capable of emission after the call setup (a ringing signal can at first not be transmitted), a calling subscriber who has dialed another subscriber not only can wait for the beginning of the emission of the ringing signal but, rather, he can wait as long as the ringing delay. In other words, he can wait as long as desired should the ringing delay last that long. In this case, the central control unit would be activated again and again by the corresponding subscriber line circuit of the dialed subscriber beginning with the emission of the ringing signal. This would repeat until a allocation and emission of ringing signals has become possible over this subscriber line circuit in the manner described above.

However, there is also the possibility of limiting the ringing delay time. In this case, the allocation memory may be enlarged by, for example, two memory rows which are referred to as waiting memory rows. When, upon dialing a subscriber, a memory location or cell is no longer free in any of the memory rows x1 through x8, (i.e. in none of the columns of the allocation memory according to FIG. 2 allocated to the phase relations) then the address of the dialed subscriber line circuit is stored at a waiting memory location in one of the two waiting memory rows and allocated to one of the phase relations, that is in one of the columns of the allocation memory, namely together with a summary time value. This may be derived from the storage time value plus a delay time value determined by a fixed, maximum ringing delay time.

This storage preferably occurs in the column of the allocation memory corresponding to the ringing phase which follows the given point in time of storage as the next ringing phase. When a waiting memory location is no longer free in the corresponding column of the allocation memory, then a storage ensues in that column of the allocation memory in which a waiting memory location is free and which is closest to the aforementioned column.

When the regular ringing current pulse emission is sequenced in the manner described further above and the allocation switch means z of the central control unit Z successively reads out the addresses of a respective column of the allocation memory and acoomplishes engagement of the respective ringing current pulse current paths (for example over the contaots 1bn and 2bn), then it also finally arrives at the memory locations belonging to the waiting memory rows in the corresponding column of the allocation memory. Upon read-out of the remaining memory locations, the allocation control means has already determined whether addresses of switch facilities are still stored at all memory locations.

In case a memory location has become free in the interim, the allocation control means undertakes a restoring of an address from a waiting memory location to the memory location which has become free in the interim, whereby the address from that waiting memory location having the higher summary time value is restored since the greatest ringing delay time has already elapsed for the subscriber line circuit dialed in accordance with this address. When two memory locations in a column of the allocation memory have become free in this manner in the interim, then two such restoring operations can be executed. Given a re-storage, the stored time value is cancelled. The subscriber line circuits corresponding to the re-stored addresses participate in the switch operations of the ringing current pulse emission beginning at this point in time. The first respective ringing current pulse is forwarded for emission in conjunction with the restorage.

When in the time span of a ringing cycle no memory location has been freed in a column of the allocation memory in which all memory locations are occupied with addresses, (the memory location having become free due to one of the called subscribers having answered) then a restorage cannot occur. The allocation control means then respectively reads the summary time value out of the waiting memory locations of the corresponding column of the allocation memory and compares each of the two to an actual time value which it derives from an actual time value generator (not illustrated). When the actual time value is higher than the stored summary time value, then the respective address of the corresponding dialed subscriber line circuit is cancelled from the corresponding waiting memory location and the busy condition is activated by the central control unit in the subscriber line circuit in the manner described above. On the other hand, the corresponding address in this waiting memory location continues to exist for the duration of a further ringing cycle.

It thus results that by fixing a maximum ringing delay time value, subscribers can if necessary wait a specific time (ringing delay time) when dialing another subscriber, but given an elapsation of said time without success, they receive the busy signal. A connection of the busy signal by the central control unit occurs in a manner known per se and is therefore not described in greater detail here.

When a called subscriber answers, then the emission of the alternating current ringing pulse is immediately terminated in a known manner. At the same time, a corresponding instruction is forwarded to the allocation control means z, the instruction initiating the allocation control means z to immediately cancel the address of the corresponding subscriber termination of the subscriber station of this subscriber in the allocation memory. By so doing, the emission of further alternating current ringing pulses to this subscriber station is suppressed. Addresses of switch facilities, for example of subscriber line circuits, can again be written in the allocation memory in the memorY locations which have been freed-up, these being written in conjunction with new allocation switch events in the manner described above.

Figure 3:
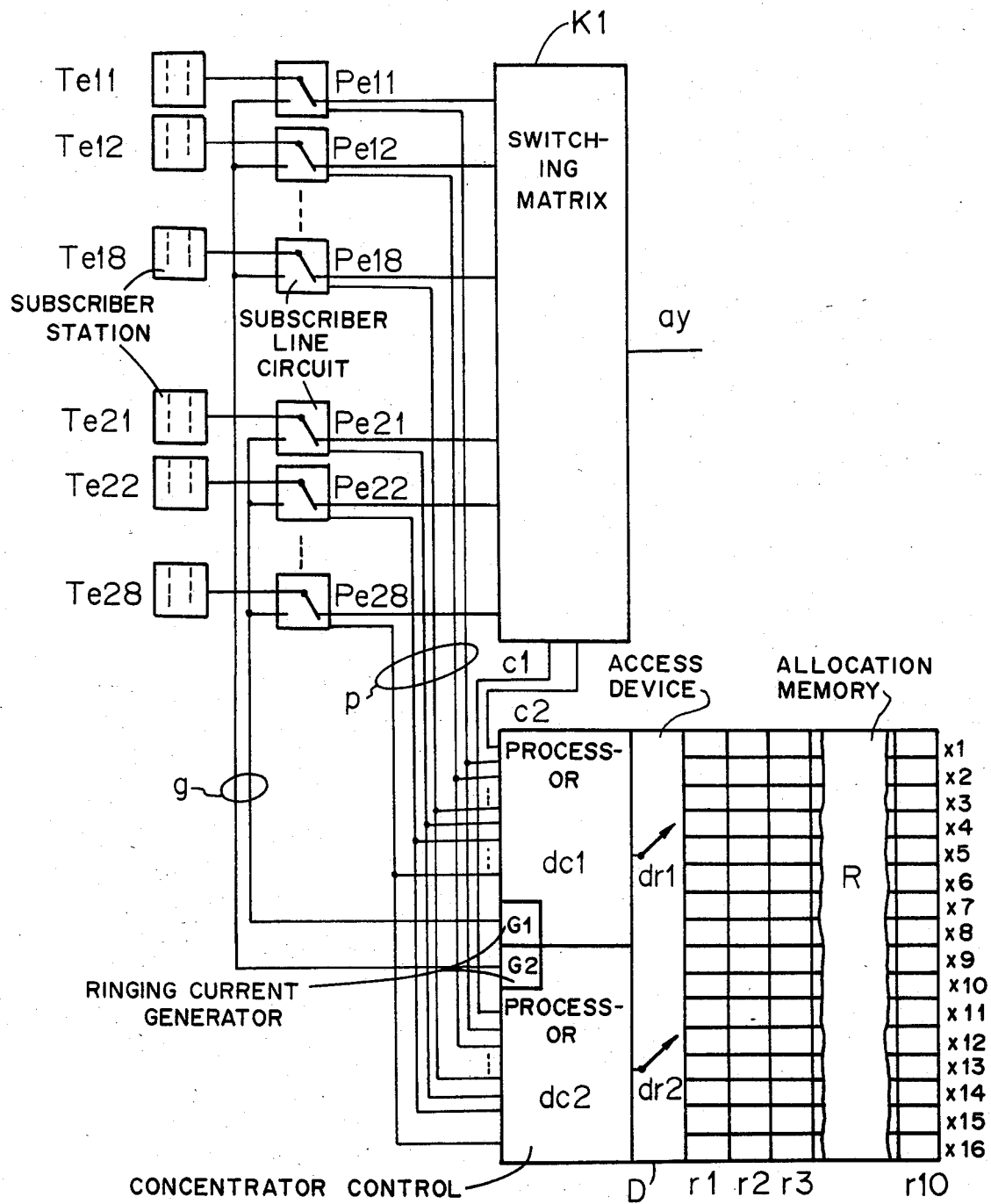
FIG. 3 illustrates a concentrator in a telephone exchange system according to another embodiment of the invention.

A further embodiment representing a concentrator is illustrated in FIG. 3 of the drawing. This unit contains a switching matrix K1 which may be assumed to be connected over a line bundle or a multi-channel line ay to the switching matrix network K illustrated in FIG. 1. The switching matrix K1, just like the switching matrix network K, can be designed for a connection setup in a time-division multiplex technique.

The concentrator according to FIG. 3 contains, among other things, a concentrator control D. It has two processors dc1 and dc2. These function independently of one another. They share an allocation memory R, based on FIG. 2. Each of the two processors executes a call through-connection within the switching matrix K1. The two control lines c1 and c2 serve this purpose. Each of the two processors is connected over a separate control channel to the central control unit Z in FIG. 1.

Two groups of subscriber stations are provided, Te11 through Te18 and Te21 through Te28. Each group comprises eight subscriber stations. The number of subscriber stations per group and the number of groups of subscriber stations can also be differently selected.

The two processors dc1 and dc2 are individually allocated to the groups of subscriber stations. The subscriber stations are keyboard selection subscriber stations. Conventional dial plate subscriber stations can, however, also be provided. Each processor services the subscriber stations of the respective group of subscriber stations allocated to it. This relates to the outgoing call setup. Control current paths which are referenced overall with p are provided per subscriber line circuit for the cooperation between the subscriber line circuits Pe11 through Pe18 and Pe21 through Pe28. As proceeds therefrom, all subscriber line circuits are in connection with each of the two processors. By assistance, each of the two processors can service all subscriber line circuits. This relates to the control operations known per se which the processors execute for the subscriber line circuits.

A respective change-over contact which is not referenced in detail is illustrated in each of the subscriber line circuits. It is a change-over contact for the emission of ringing current pulses corresponding to the contacts 1bn and 2bn in the subscriber line circuit P1 in FIG. 1. Only a single respective contact is illustrated in FIG. 3 per subscriber line circuit in order to simplify the graphic presentation. The structure and functioning of the concentrators is presumed here as being known and is therefore not described in greater detail. The handling of the emission of ringing current pulses is of particular significance in the context of this invention.

Ringing current generators G1 and G2 are individually allocated to the two processors dc1 and dc2. A respective group of subscribers is individually allocated to each of the two ringing current generators as the two ringing current lines serving for ringing current emission show, these being referenced overall with g. With respect to the call-handling capacity, each of the two ringing current generators is dimensioned such that this call-handling capacity suffices for operations of ringing current pulse emission to be executed simultaneously in normal traffic. Let it be assumed that, given normal peak traffic, ringing current pulses have to be forwarded for emission simultaneously over six subscriber line circuits of a subscriber group in each of the total of ten ringing phases. Departing from the previous specification, let it be assumed hereafter that each of the subscriber groups encompasses 600 respective subscriber stations with 600 allocated subscriber line circuits.

Since the two processors function completely independently of one another, are each capable of connecting through the same calls to subscriber stations of each of the two subscriber groups, and each control the emission of ringing current to each subscriber station respectively called under its control influence, and since a ringing current generator is dimensioned for six simultaneously occurring ringing current emission events in each of the ten ringing phases, each of the two processors dc1 and dc2 only permit simultaneous ringing current emission at three subscriber line circuits in each of the ringing phases. Since in the extreme case both processors can simultaneously handle three respective ringing events in a ringing phase in one and the same subscriber group, a total of six ringing events respectively load a ringing current generator, and its maximum call-handling capacity (apart from the first ringing current pulse—see above) is thus exhausted.

With the definition explained above, the maximum call-handling capacity of each of the two ringing current generators is considered under the special aspect of an extremely one-sided traffic load with respect to the two subscriber groups and with respect to incoming calls. In the normal case, however, one must count on a more balanced traffic load. This means that each of the two processors as a rule controls incoming connections in each of the two subscriber groups, i.e. among other things, corresponding ringing current pulse emission events. Since their number per processor is limited by the above definition to three, the ringing generators would be generally underloaded in the normal case, i.e. would be exploited to a completely insufficient degree. In order to counter such a disadvantage, various modified embodiments are provided. In order to understand them, knowledge of the structure of the allocation memory R and its cooperation with the processors dc1 and dc2 must be understood.

Ten columns r1 through r10 and 16 rows x1 through x16, i.e. a total of 160 memory locations, are provided in the allocation memory R, of which each is defined by a row designation and by a column designation. Let the upper eight rows x1 through x8 be allocated to the processor dc1 and the lower eight rows x9 through x16 be allocated to the processor dc2. The counting mode of the rows thus is the inverse of that in FIG. 2. An access means, for example dr1, is allocated to each processor, for example dc1. With the assistance of its access means, each of the two processors executes the write operations and the read operations in the allocation memory R.

It is possible with the assistance of the access devices dr1 and dr2 to store addresses of subscriber line circuits Pe11 through Pe28 at the memory locations of the allocation memory R. These addresses serve an emission of ringing current pulse sequences by means of the illustrated change-over contacts in the same manner as was described in detail on the basis of the arrangement according to FIG. 1. These subscriber line circuits thus are switch facilities over which, on the average, signals in the form of alternating current call pulses are emitted only during a part of all of their respective occupation, and are emitted by means of connection to a signal current source (ringing current generator) with a call-handling capacity limited with respect to the signal current load. Thus signalling likewise ensues for the purpose of distributing the load in the form of pulse sequences having respectively identical pulse spacings, whereby the pulses of pulse sequences simultaneously emitted over various subscriber line circuits chronologically exhibit different phase relations and, as a result, exhibit a chronological offset from subscriber line circuit to subscriber line circuit, namely an offset by means of which the pulses of different pulse sequences connect chronologically to one another in terms of pulse termination and pulse beginning. Furthermore, in the case of the circuit arrangement according to FIG. 3, the subscriber line circuits are also allocatable to one of the respective pulse sequences, i.e. to a pulse sequence with a specific phase relation. This occurs by means of storing the address of the corresponding subscriber line circuit in a memory location of a very specific column of the allocation memory R. This allocation, i.e. this storage, occurs upon consideration of already existing allocations, i.e. storages of addresses of subscriber line circuits with whose assistance the ringing current emission occurs over the respectively corresponding subscriber line circuit.

In the allocation memory R in FIG. 3, the upper eight rows are allocated to the processor dc1 and the lower eight rows are allocated to the processor dc2. Given storage of addresses of subscriber line circuits by the processor dc1 with the assistance of its access device dr1, this access device seeks free memory locations in the respectively corresponding column in the sequence of the designation of the rows, i.e. always proceeding from the uppermost memory location which belongs to the row x1. Given the storage of addresses by the processor dc2 with the assistance of its access device dr2, this access device seeks free memory locations in the respectively corresponding column opposite the sequence of the designation of the rows, i.e. always proceeding from the lowermost memory location which belongs to the row x16.

No more than a certain number of subscriber line circuits conditioned by the ringing current load prescribed by the loadability of the ringing current generation is allocated to each of the pulse sequences having a respectively specific phase relation. Let the ringing current loadability of each ringing current generator now be dimensioned such that each of the two ringing current generators G1 and G2 allows ringing current pulses to be simultaneously emitted to six different subscriber stations. Beyond that, each of the two ringing current generators also has a call-handling reserve which is provided for an emission of one respective first ringing current pulse after setup of a connection. This first ringing current pulse thus is chronologically determined by the point in time of the setup of a connection, and generally lies outside of the phase relation of the following, further ringing current pulses.

Each of the two processors controls connections to calling subscribers in each of the two subscriber groups Te11 through Te18, and Te21 through Te28, in terms of all switching operations to be carried out, i.e. in terms of the ringing current pulse emission. It can also be true that both processors accidentally simultaneously set up all incoming connections in the process of being set up within one and the same subscriber group. And since each of the two ringing current generators is respectively allocated to one of the two subscriber groups (see the two separate ringing current lines g), it is provided according to a first alternative execution of the arrangement according to FIG. 3 that each of the two processors can transmit or initiate only three respective ringing current pulses in each of the ten phase relations, i.e. each of the two processors cannot allocate more than three subscriber line circuits to each of the pulse sequences having a respective specific phase relation. With its access device dr1, the processor dc1 can thus write addresses into each of the columns of the allocation memory R only in the respective uppermost three memory locations, i.e. in the memory locations which lie in the lines x1 through x3. The analogous case applies to the processor dc2. When three respective addresses of subscriber line circuits are stored in all columns of the allocation memory R, and when incoming connections are also to be set up to subscriber stations to be called (the ringing current pulse emission, of course, also belonging thereto), then these further connections in the process of being set up are either switched to busy (whereby busy signals are transmitted to the calling subscriber) or, in the manner already described on the basis of FIG. 1, subscriber line circuits are respectively allocated to a pulse sequence with a specific phase relation. Accordingly, in addition to the address of the respectively corresponding subscriber line circuit, the summary time indication (already explained) is stored at the corresponding memory location together with the address. The memory locations in the rows x4 through x8 or x13 through x9, respectively, can be employed for this purpose.

According to a second alternative of the circuit arrangement according to FIG. 3, each of the ringing current generators is capable of emitting a signal indicating an overload. This overload signal is supplied to each of the two processors and is stored within each of the two processors for a security time of, for example, 10 s. It is now provided according to this second alternative that each of the two processors can simultaneously emit five ringing current pulses per phase and that, given existence of the overload signal, each of the two processors can only emit three ringing current pulses per phase. It is possible in this manner to avoid overload peaks for each of the two ringing current generators.

According to a third alternative of the arrangement according to FIG. 3, each of the two processors respectively stores the addresses of the subscriber line circuits in two different memory regions. Thus, let the processor dc1 store the addresses of the subscriber line circuits of the subscriber group Te11 through Te18 in the memory locations in the rows x1 through x3 of the allocation memory R, and the addresses of the subscriber line circuits of the subscriber group Te21 through Te28 at the memory locations in the rows x4 through x6. The analogous case applies to the processor dc2. According to this third alternative, each of the two processors can transmit three respective ringing current pulses simultaneously per phase in each of the two subscriber groups.

According to a fourth alternative of the arrangement according to FIG. 3, the uppermost six rows x1 through x6 in the allocation memory R are allocated to the ringing current generator G1, and the lowermost six rows x16 through x11 are allocated to the ringing currrent generator G2. In the case of this alternative, the two access devices dr1 and dr2 are enabled to undertake roll-in operations in all rows of the allocation memory. Accordingly, the storage occurs such that the processor dc1 for example, undertakes roll-in operations into the upper six rows with its access device dr1 when it is a matter of addresses of the subscriber line circuits Pe21 through Pe28. It executes its roll-in operations into the lowermost six rows of the allocation memory when it is a matter of addresses of subscriber line circuits Pe11 through Pe18. Thus for each group of subscribers, six respective simultaneous ringing call pulses per phase relation can be transmitted.

A fifth alternative of the arrangement according to FIG. 3 proceeds from the third alternative described above. According to the fifth alternative, a processor dc1, for example, can simultaneously forward five ringing current pulses per phase for emission to the one ringing generator G1, for example, but can only forward three ringing current pulses per phase for the other ringing current generator G2, for example. The analogous case applies inversely to the other processor. As a result of this certain asymmetry concerning the utilization of each of the two ringing generators by each of the two processors, the exploitation of the call-handling capacity of the two ringing current generators can be further increased, whereby the jeopardy of an anticipated overload on relatively rare occasions being accepted. Such an overload would occur only relatively rarely with a high degree of probability. This alternative can be combined in an advantageous manner with the second alternative described above.

In conclusion, let an advantageous alternative possibility concerning the re-storing of addresses of switch facilities, for example, subscriber line circuits, from one waiting memory location to a memory location of the allocation memory be discussed as an augmentation to the description both of the arrangement according to FIG. 2 as well as of the arrangement according to FIG. 3. As was described above, a re-storing always occurs within one column of the allocation memory, i.e. only upon retention of the allocation to a phase relation once it has been selected. Deviating therefrom, however, it is also entirely possible to store an address stored at a waiting memory location of a specific phase relation at a memory location of a different phase relation when a memory location becomes free, namely is stored at this memory location. The function explained above makes fewer demands of the allocation means or of the processors in terms of the totality of control sequences to be handled. On the other hand, the function just described enables an even better exploitation of the ringing current generators since the emission of the ringing current pulses to a dialed subscriber can already begin at the earliest possible time when a memory location is freed up. Therefore, in conjunction with the re-storing just mentioned, a first ringing current pulse is immediately transmitted to the subscriber location indicated by the address.

The re-storing of an address of a switch facility over which alternating current call pulses are to be transmitted can thus occur from a waiting memory location to a memory location of the allocation memory which has been freed up. This can occur when the allocation means according to FIG. 2 or one of the access devices according to FIG. 3 respectively determines in a column of the corresponding allocation memory both that a memory location has become free, as well as that a waiting memory location is still occupied in the same column. In this case, the transmission of the first ringing current pulse already ensues in the time grid of the further ringing current pulses. This does not occur immediately upon release of a memory location as a result of a dialed subscriber station having answered but, rather only when the corresponding column of the allocation memory has been routinely reached by the allocation means or by one of the access devices being reached with the address of a switch facility stored at a waiting memory location. Given a corresponding modification of the described arrangements, however, the re-storing can already occur earlier. When, for example, a freed-up memory location is encountered in a routinely selected column, then an address of a switch facility which is stored at a waiting memory location in a different column of the allocation memory can be re-stored into this memory location which has become free due to a subscriber answering. As a result, the ringing delay time for the corresponding subscriber is shortened. A further abbreviation can be achieved when the re-storing is not delayed until the routine advance to the column with the memory location which has become free due to a subscriber answering, but rather already occurs immediately after it has become free. In this case, a first ringing current pulse can be forwarded for emission in a functional and chronological interrelationship with the re-storing, i.e. at an earlier point in time. This can occur immediately after the response of the other subscriber called up to then, the first ringing current pulse being forwarded for emission earlier than in the calling phase in which the column of the corresponding memory location is routinely reached. When a memory location becomes free, it is also possible to only carry out the emission of a first ringing current pulse and to undertake the re-storing only when the column of the corresponding waiting memory location is routinely reached. The shortening of the ringing delay time relieves both the connection paths (trunk lines and switching matrix networks) as well as the devices controlling them. The access devices or the allocation control device are to be differently designed for the above-described modifications, specifically such that the corresponding control sequences can be accomplished.

The switching matrix network K is a commercially available unit of Siemens AG and is described in Siemens catalog "Telcom Report", Supplement 1981(*) at pages 28 and following. The central control unit Z is also a commercially available unit of Siemens and is described in the same brochure on pages 33 and following.

(*) "Telcom report, Volume 4 (1981), Special Issue 'EWSD Digital Switching System'".

The allocation control means z is a conventional memory with a write device and a read device. The write device checks the memory locations (x1 through x8, respectively, at r1 through r10—see FIG. 2) for phase relation so as to determine whether at least one of these locations is free, and can then select a free memory location. The memory means then undertakes a write operation (roll-in). The allocation control means z further contains a read device which, in the rhythm of the cyclical sequence of the call phases, reads the addresses of subscriber circuits P1 through Pn and of connector sets V and W stored per call phase in the memory locations. The subscriber circuits and connector sets are then driven with these addresses, and the switch instructions "turn ringing current on" and "turn ringing current off" are emitted.

As to the alternate embodiment of FIG. 3, the switching matrix k1 is the EWSD Digital Electronic Switching System of Siemens which is commercially available, and is described in Siemens Catalog "EWSD - Digital Electronic Switching System A30808-X2589-X100-1-7618" and in a "Technical Description EWSD Digital Electronic Switching System - SIEMENS TELEPHONE SYSTEMS", issued by Public Telephone Systems Division Hofmannstr. 51, D-8000 Munich 70. The concentrator control D comprises two processors dc1 and dc2 which function independently of one another. They share a standard prior art allocation memory R. The two processors are also well known in the art and execute a call through-connection within the switching matrix K1. The two processors dc1 and dc2 which function in the described manner are in their function too comparable with the allocation control means z shown in FIG. 1. Allocation control means and allocation memory means are well known in the art by U.S. patents, of which the patent numbers are:

U.S. Pat. No. 4,153,951 filed Sept. 24, 1976.
U.S. Pat. No. 4,025,903 filed Sept. 10, 1973

Although various changes and modifications might be proposed by those skilled in the art, it will be understood that we wish to include within the claims of the patent warranted hereon all such changes and modifications as reasonably come within our contribution to the art.

I claim as my invention:

1. In a method for signalling subscribers in a telecommuncation exchange system wherein
    each subscriber connects via a subscriber line circuit to a central switching network for routing incoming calls to an identified subscriber;
    an electrical current call generator as a signalling power source is provided which is connected to each of the subscriber line circuits so as to supply signal current pulses thereto for signalling the respective subscribers;
    each subscriber line circuit having a call connector switch which in a first position connects the subscriber through the subscriber line circuit to the switching matrix network and in a second position switches said signal current from the call generator through to the subscriber;
    and the signalling to the subscriber comprising a plurality of spaced signalling pulses;
    wherein the improvement comprises the steps of:
        providing an allocation control having an allocation memory, a writer device connected to the allocation memory, and a read device connected to the allocation memory, the allocation memory comprising a matrix with a plurality of storage positions and having a given number of divisions along a first dimension and a given number of divisions along a second dimension;
        providing the matrix first dimension such that it corresponds to a signalling cycle wherein a given subscriber being called receives a signal pulse, each division of the first dimension corresponding to a different phase during the ringing cycle;
        providing the second dimension such that its given number of divisions corresponds to a maximum number of subscribers to which a signalling pulse is to be sent during a given phase of the ringing cycle;
        after completion of a connection set-up to a given subscriber line circuit of a repsectively dialed subscriber by the switching matrix network, writing an identification of the respective subscriber line circuit with the write device into one of the positions of the allocation memory matrix;
        reading the matrix with the read device along the first dimension such that subscriber identifications stored for each ringing phase during a ringing cycle are read out, said read out subscriber identifications being employed to switch the respective call connector switches and thus pass signalling current to the respective subscriber so as to provide the signalling pulse to each of the subscribers identified during the given phase, the call connector switch being disconnected from the current call generator as soon as the next phase is being read, the read device then repeating the reading of the phases for another ringing cycle so as to send another signal pulse to the subscriber; and
        when the subscriber answers or when the switching matrix network indicates that the subscriber is no longer being called, the write device cancelling the respective subscriber identification from the matrix memory so that further signalling pulses to the subscriber do not occur.

2. A method according to claim 1 including the step of:
    using the write device to first check at least one phase of the ringing cycle to determine whether all positions along the second dimension of the memory matrix for that ringing cycle phase are filled.

3. A method according to claim 1 including the steps of:
    employing the write device to check the ringing cycle phases prior to writing in of a subscriber identification so as to determined which phase or phases have a least number of subscriber identifications assigned thereto and then writing in the subscriber identification being called in a next position of the phase or phases having the least number of filled positions.

4. A method according to claim 1 including the steps of:
    employing the write device to check whether all positions in the matrix are filled with subscriber identifications, and if they are all filled, then sending an instruction to the switching matrix network to initiate a busy signal to the respective subscriber being called.

5. A method according to claim 1 including the steps of:
    employing the write device to check whether all positions in the matrix are filled with subscriber identifications, and if they are all filled, then storing the subscriber identification to be written in for a given time period during which a space in the allocation memory may become free, and if at the end of said delay time a space does not become free, signalling the switching matrix network to initiate a busy signal.

6. A method according to claim 1 wherein the subscribers are telephones to which ringing pulses are sent and wherein said call generator comprises an alternating current call generator the current of which is employed to ring the telephone of the subscriber during each ringing cycle, a ring occuring for each identified subscriber at a respective phase during each ringing cycle.

7. A method according to claim 1 including the step of selecting the number of divisions of the second dimension of the matrix establishing a maximum number of subscribers simultaneously signalled during a given phase of the ringing signal based upon a maximum current handling capability of the current generator.

8. In a system for signalling subscribers in a telecommunication exchange system wherein
    each subscriber connects via a subscriber line circuit to a central switching network for routing incoming calls to an identified subscriber;
    an electrical current call generator as a signalling power source is provided which is connected to each of the subscriber line circuits so as to supply signal current pulses thereto for signalling the respective subscribers;

each subscriber line circuit having a call connector switch which in a first position connects the subscriber through the subscriber line circuit to the switching matrix network and in a second position switches said signal current from the call generator through to the subscriber;

and the signalling to the subscriber comprising a plurality of spaced signalling pulses;

wherein the improvement comprises:

an allocation control means having an allocation memory, a write device means connected to the allocation memory, and a read device means connected to the allocation memory, the allocation memory comprising a matrix with a plurality of storage positions and having a given number of divisions along a first dimension and a given number of divisions along a second dimension;

the matrix first dimension corresponding to a signalling cycle wherein a given subscriber being called receives a signal pulse, each division of the first dimension corresponding to a different phase during the ringing cycle;

the second dimension given number of divisions corresponding to a maximum number of subscribers to which a signalling pulse is to be sent during a given phase of the ringing cycle;

said write device means after completion of a connection set-up to a given subscriber line circuit of a respectively dialed subscriber by the switching matrix network, writing an identification of the respective subscriber line circuit into one of the positions of the allocation memory matrix; and the read device means reading the matrix along the first dimension such that subscriber identifications stored for each ringing phase during a ringing cycle are read out.

* * * * *